United States Patent
Rinck

(10) Patent No.: US 10,563,419 B2
(45) Date of Patent: Feb. 18, 2020

(54) TOWER FOR A WIND POWER PLANT

(71) Applicant: VENSYS ENERGY AG, Neunkirchen (DE)

(72) Inventor: Jürgen Rinck, Mandelbachhtal (DE)

(73) Assignee: VENSYS ENERGY AG, Neunkirchen (DE)

( * ) Notice: Subject to any disclaimer, the term of this patent is extended or adjusted under 35 U.S.C. 154(b) by 0 days.

(21) Appl. No.: 15/743,157

(22) PCT Filed: Jul. 8, 2016

(86) PCT No.: PCT/DE2016/100303
§ 371 (c)(1),
(2) Date: Jan. 9, 2018

(87) PCT Pub. No.: WO2017/005252
PCT Pub. Date: Jan. 12, 2017

(65) Prior Publication Data
US 2018/0202182 A1    Jul. 19, 2018

(30) Foreign Application Priority Data
Jul. 9, 2015   (DE) .................. 10 2015 111 109

(51) Int. Cl.
*E04H 12/08* (2006.01)
*E04H 12/34* (2006.01)
(Continued)

(52) U.S. Cl.
CPC ......... *E04H 12/085* (2013.01); *E04H 12/342* (2013.01); *F03D 13/10* (2016.05);
(Continued)

(58) Field of Classification Search
CPC ..... E04H 12/085; E04H 12/342; F03D 13/10; F03D 13/20
See application file for complete search history.

(56) References Cited

U.S. PATENT DOCUMENTS 7,360,340 B2 *  4/2008  Grundman ................ E04C 3/30
                                                       52/40
8,590,276 B2 * 11/2013  Kryger .................. E04H 12/085
                                                       52/845
(Continued)

FOREIGN PATENT DOCUMENTS

DE      102010039796 A1    12/2011
DE      102011053017 A1     2/2013
(Continued)

*Primary Examiner* — Paola Agudelo
(74) *Attorney, Agent, or Firm* — Lucas & Mercanti, LLP; Klaus P. Stoffel

(57) ABSTRACT

A tower for a wind power plant, including a tower section having multiple structural support elements which, arranged horizontally next one another, form part of an outer wall of the tower. The wall elements that are arranged directly next to one another are rigidly interconnected via horizontal end sections of the wall elements and not—or only in certain sections—via vertical edges of the wall elements. Expediently, the vertical edges of the wall elements, which are in each case arranged directly adjacent to one another, are arranged entirely or in certain sections at a distance from one another in the horizontal direction. A connection element, preferably a flange, is formed on each of the horizontal end sections for connecting the wall elements to a substrate, to other wall elements of a further tower section, to a tower head supporting a wind turbine, and/or to an adapter element.

16 Claims, 4 Drawing Sheets

(51) Int. Cl.
  *F03D 13/20* (2016.01)
  *F03D 13/10* (2016.01)
(52) U.S. Cl.
  CPC .......... *F03D 13/20* (2016.05); *F05B 2240/40* (2013.01); *F05B 2240/912* (2013.01); *Y02E 10/728* (2013.01)

(56) References Cited

U.S. PATENT DOCUMENTS

| | | |
|---|---|---|
| 9,091,095 B2 | 7/2015 | Bögl et al. |
| 9,243,418 B2 | 1/2016 | Bögl et al. |
| 9,249,784 B2 | 2/2016 | Larsen et al. |
| 2005/0129504 A1* | 6/2005 | De Roest .............. E04H 12/085 415/4.2 |
| 2009/0217618 A1* | 9/2009 | Cook .................... E04H 12/085 52/844 |
| 2011/0138721 A1 | 6/2011 | Bagepalli |
| 2012/0141295 A1* | 6/2012 | Martinez De Castaneda .............. E04H 12/085 416/244 R |
| 2013/0104489 A1* | 5/2013 | Stiesdal .................. E04H 12/34 52/651.01 |
| 2018/0087287 A1* | 3/2018 | Gremling ................ F03D 13/20 |

FOREIGN PATENT DOCUMENTS

| | | |
|---|---|---|
| EP | 2463512 A2 | 6/2012 |
| EP | 2857615 A1 | 4/2015 |
| WO | 2009097858 A1 | 8/2009 |
| WO | 2011157476 A2 | 12/2011 |
| WO | 2013029626 A1 | 3/2013 |
| WO | 2015049362 A1 | 4/2015 |

\* cited by examiner

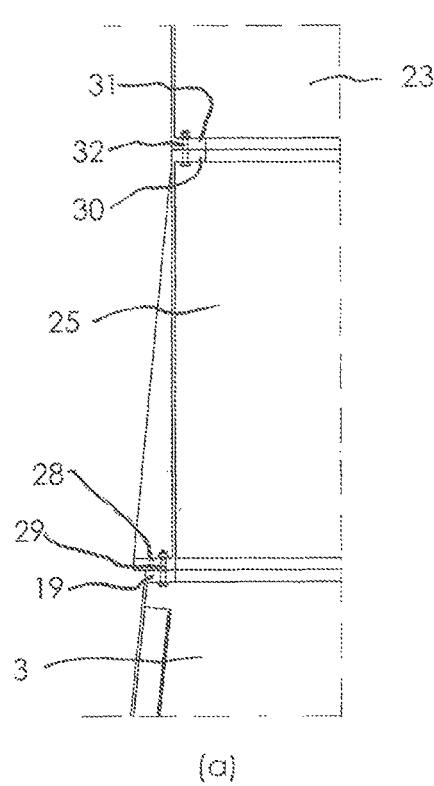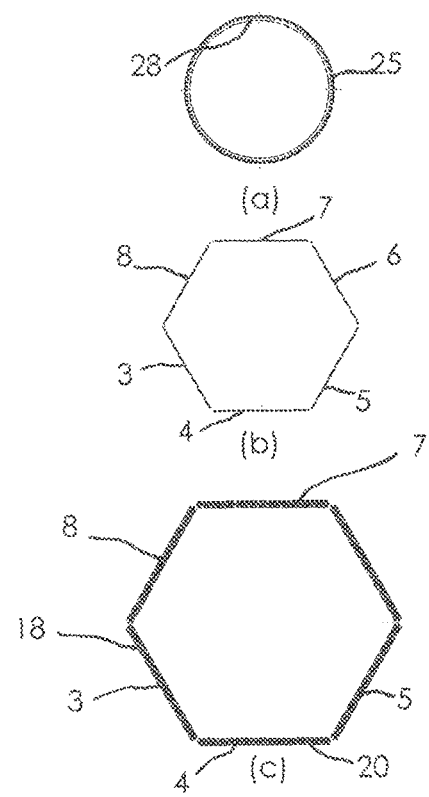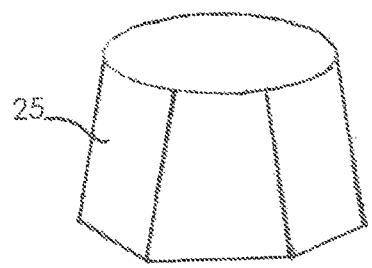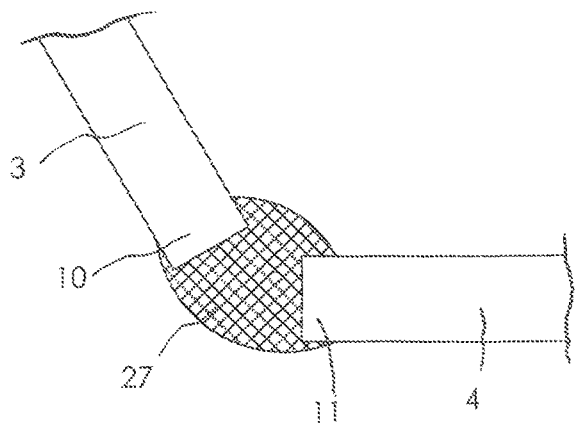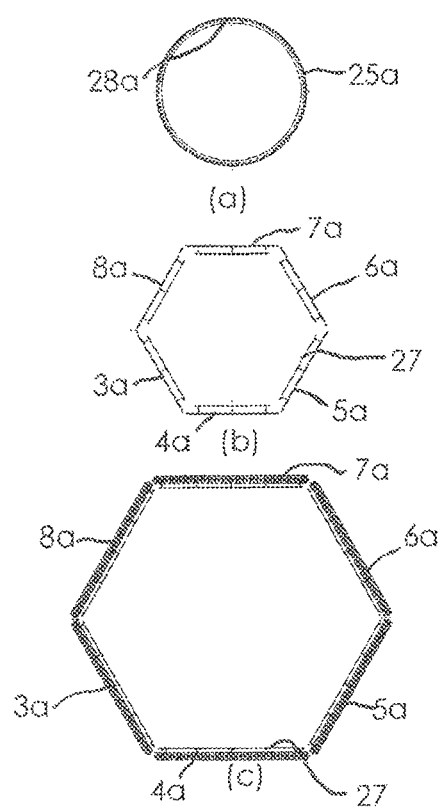
Fig. 5
Fig. 6
Fig. 7
Fig. 8

TOWER FOR A WIND POWER PLANT

The present application is a 371 of International application PCT/DE2016/100303, filed Jul. 8, 2016, which claims priority of DE 10 2015 111 109.8, filed Jul. 9, 2015, the priority of these applications is hereby claimed and these applications are incorporated herein by reference.

BACKGROUND OF THE INVENTION

The invention relates to a tower of a wind power plant, comprising at least one tower segment that has a plurality of load-bearing wall elements which, arranged horizontally next to one another, form an outer wall of the tower. The invention additionally relates to a wall element for the tower of the wind power plant and to a method for producing the tower.

In order to erect wind power plants whose tower head is arranged at a distance of more than 100 m from the ground, for static reasons it is necessary to use towers having a diameter greater than 4.30 m at their base, by which they are fastened to a foundation. Since single-part structural elements that could form the base of the tower cannot be transported via the existing transport routes, the base of the tower is either constructed on-site as a concrete structure or it is constructed from a plurality of prefabricated wall elements that have to be connected to one another.

A tower of the type stated at the outset, formed from a plurality of prefabricated wall elements that can be connected to one another, is disclosed by WO 2009/097858 A1. Formed along lateral vertical edges of the wall elements there are flanges, by means of which the wall elements, which are arranged horizontally next to one another, can be directly connected to one another.

Erecting the tower composed of the wall elements requires a large amount of work. On the one hand, the wall elements must be arranged with an exact fit in relation to one another, so that the flanges can be connected to one another. Moreover, forming, checking and servicing connections that are formed by means of the flanges is demanding of resources, particularly since regions of the tower in which the flanges are arranged are frequently not accessible, or are not easily accessible, in the tower.

SUMMARY OF THE INVENTION

The invention is based on the object of creating a tower, of the type stated at the outset, that is easier to erect and service, as compared with the known towers.

According to the invention, this object is achieved in that a rigid connection is formed, between the wall elements that are arranged horizontally directly next to one another, by means of horizontal end portions of the wall elements, and not effected, or is effected only in certain segments, by means of vertical edges of the wall elements.

It has been found, unexpectedly, that the tower segment can be realized with sufficient robustness for the large mechanical loads that act on the wind power plant, even if there is no rigid connection, connecting the wall elements to one another, that is formed over the entire length of the vertical edges and that is suitable for transmitting the forces and torques acting on the wall elements.

If, as provided in the preferred embodiment of the invention, only the horizontal end portions, but not the vertical edges of the wall elements, are used to realize the rigid connection, there is advantageously no need to expend resources in forming the rigid connection by means of the vertical end portions when the tower segment is being erected, and there is also no need for servicing. Moreover, the wall elements can be produced less expensively, since there is no need to provide connecting means at the vertical edges.

Insofar as the rigid connection is not formed exclusively by means of the horizontal end portions, but a connection is additionally provided by means of at least one segment of the vertical edges that forms a part of the rigid connection, expediently the segment is, or insofar as several of the segments are provided, the segments jointly are, of a length of not more than 10%, preferably not more than 5% of the total length of the vertical edges respectively connected to one another. In comparison with the known towers, in which the rigid connection exists over the entire length of the vertical edges, in the case of this variant also the amount of installation and servicing work is reduced considerably, in particular if the segment is formed, or the segments are formed, in an easily accessible region of the tower segment.

In a development of the invention, each of the wall elements is formed by a prefabricated structural unit that comprises a plate and the connection means. In the preferred embodiment, the plate is quadrangular, preferably rectangular or trapezoidal. The plate is expediently of an elongate design, the ratio of length to width preferably being at least 4:1, particularly preferably at least 5:1. It is understood that the wall elements in the tower segment are arranged in such a manner that their longitudinal axes are each oriented vertically. In one embodiment of the invention, the plate, which is preferably formed as a single part, comprises steel, concrete or a composite material, in particular reinforced concrete, the fiber composite material, preferably glass-fiber or carbon-fiber composite material, or is composed of one of these materials.

For mechanical reinforcement of the plate, it may be provided with one or more stiffening ribs.

The plate expediently is of a flat shape, but may also be curved, so that the tower segment can be formed so as to be of a round shape, at least in certain segments, preferably circular overall.

In a preferred embodiment of the invention, the wall element is at least 15 m, preferably at least 20 m, in length. It is preferably intended to form a lower region of the tower, in particular the base of the tower. It is also conceivable, however, for a plurality of the said tower segments to be arranged over one another. The said tower could even be constructed from the wall elements.

In a particularly preferred development of the invention, the vertical edges of the wall elements, which are in each case arranged directly adjacent to one another, are arranged entirely at a distance from one another in the horizontal direction. Since there is no direct contact of the wall elements at their vertical edges, on the one hand the work required for erecting the tower is simplified considerably, and on the other hand the wall elements do not have to be designed to withstand loads that occur as a result of the direct contact.

In one embodiment of the invention, the tower, despite the wall elements being arranged at a horizontal distance from one another, is substantially closed outwardly by the wall elements. Expediently, the sum of the distances of the wall elements from one another is less than 5%, preferably less than 3%, of the total circumference of the tower. The distances of the wall elements are preferably 5 to 25 cm, preferably 5 to 15 cm.

In a further development of the invention, for the purpose of increasing the robustness of the tower segment, the vertical edges of at least individual wall elements of the directly adjacent wall elements are, in certain segments, preferably at certain points, connected to one another by at least one connection element. The connection element may be a projection on the wall element, possibly formed so as to be integral with the wall element, which projects from the respective vertical edge toward the respectively adjacent wall element, and which is designed to realize the connection. Alternatively or additionally, the connection element could be designed for fastening to the wall elements, preferably by means of screws or rivets, or by welding. Expediently, the connection element is a lug, which is preferably composed of steel or a composite material. The connection element is connected to the respective vertical edges in the vertical direction over a length of maximally 50 cm, preferably maximally 30 cm.

In one embodiment of the invention, the vertical edges are arranged at such a distance from one another that it is possible to reach through the gaps between the wall segments, in order to mount, check and/or service the connection element or elements. This proves to be advantageous, in particular, if the connection elements is connected to the wall elements by means of a screwed connection, in particular a screw and nut connection. The screwed connection can then be made, checked and/or serviced by one single person, from the inside or outside of the tower. For the purpose of making, checking and servicing the connection, the locations at which the connection elements connect the wall elements can be accessed from the outside, e.g. by means of a lift truck. There is no need to provide a mounting or servicing platform in the interior of the tower.

Expediently, formed on the respective horizontal end segments, preferably on the horizontal ends, of the wall elements there is a connection means, preferably a flange, by means of which the wall elements can be connected to a footing, to further wall elements of another tower segment, to a tower head carrying a wind turbine, and/or to an adapter element, and which is designed to form a connection member between, on the one hand, the wall elements and, on the other hand, the footing, the wall elements of the further tower segment and/or the tower head.

In one embodiment of the invention, means for sealing the tower outwardly are provided between the vertical edges of the wall elements, in order to close cavities between the wall elements that are formed as a result of the wall elements being arranged at a distance from one another, and thus to protect an interior of the tower segment against environmental influences. The sealing means, which may preferably be composed of an elastic sealing rubber or the like, serve only as a cover, and do not form a rigid connection between the wall elements.

In order to create the possibility of reaching through the spaces between the vertical edges of the wall elements even when the sealing means is provided, a preferably closable opening may be provided, in the region in which the connection element is connected to the wall elements, in particular next to the connection element, through which it is possible to reach for the purpose of mounting, checking and/or servicing.

Expediently, all wall elements of the tower, onshore or offshore, are arranged on a single foundation.

BRIEF DESCRIPTION OF THE DRAWING

The invention is explained in greater detail in the following on the basis of exemplary embodiments and the accompanying drawings, which relate to these exemplary embodiments. There are shown.

DETAILED DESCRIPTION OF THE INVENTION

Figure 1:
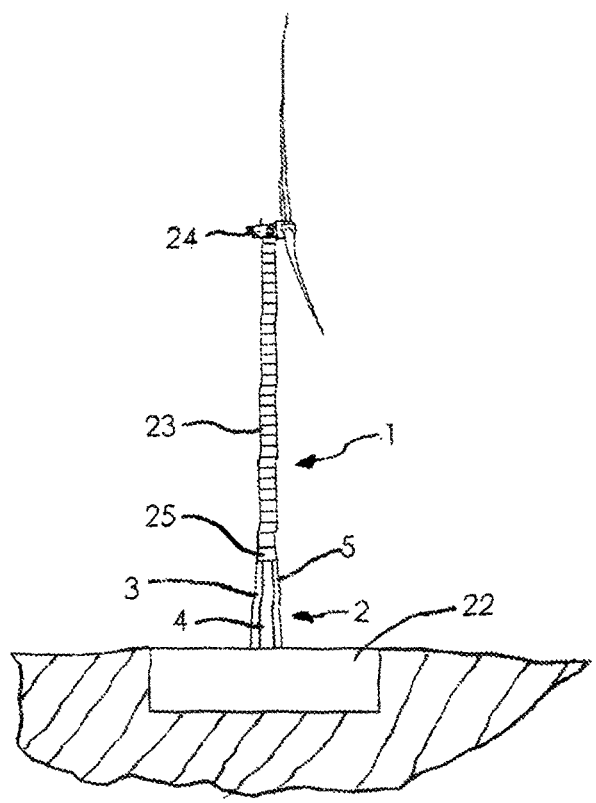
FIG. 1 a wind power plant, which is provided with a tower according to the invention, FIG. 2 a portion of the tower according to the invention according to FIG. 1, in a perspective view, FIG. 3 a portion of the tower according to FIG. 1, in a side view, FIG. 4 wall elements of the tower, according to the invention, according to FIG. 1, FIG. 5 details of a portion of the tower according to FIG. 1, FIG. 6 various sections of the tower according to FIG. 1, FIG. 7 a further detail of the tower according to FIG. 1, FIGS. 8 and 9 sections of further towers according to the invention, FIG. 10 a portion of a further tower according to the invention, and FIG. 11 a portion of a further tower according to the invention.
Figure 2:
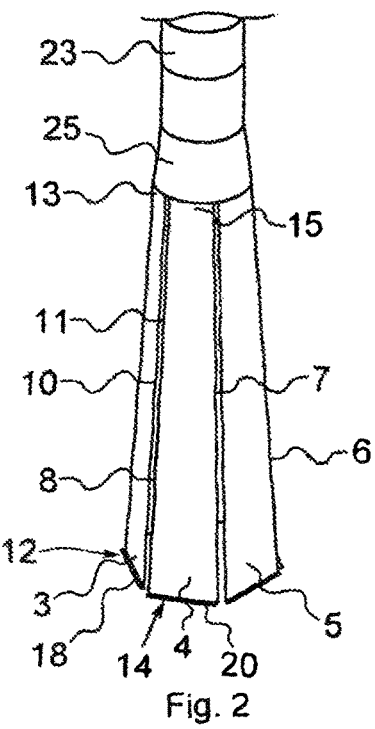

Represented in FIG. 1 is a wind power plant, having a tower head 24, which carries a generator and which is attached to a tower 1 according to the invention. The tower 1 is attached, by a lower tower segment 2, to a foundation 22 that is let into a footing. As shown more precisely in FIGS. 2 and 3, the lower tower segment 2 has six wall elements 3,4,5,6,7,8. Vertical lateral edges 10,11 of the wall elements 3,4,5,6,7,8 are arranged at a distance from one another over their entire length. However, the respective distances are relatively small in relation to the width of the wall elements 3,4,5,6,7,8, such that the tower is substantially closed outwardly by the wall elements 3,4,5,6,7,8. In the present example, the sum of the horizontal distances between the wall elements 3,4,5,6,7,8 is less than 4% of the total circumference of the tower 1.

Figure 4:
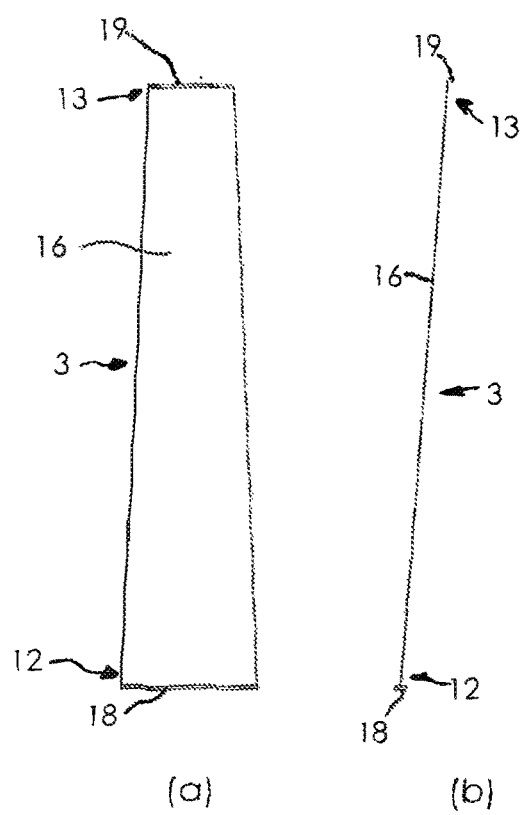

The more precise design of the wall elements 3,4,5,6,7,8 and their arrangement in relation to one another is explained in the following on the basis of the wall element 3 and the wall elements 3 and 4, which are arranged directly adjacent to one another, but this design applies to all of the wall elements 3,4,5,6,7,8. The wall element 3 represented individually in FIG. 4 comprises a plate 16, which has the shape of an equilateral trapezoid, and at base sides of the trapezoid, which form horizontal ends 12,13 of the wall elements 3, are in each case provided with a flange 18,19. The lower flange 18 is realized as a T-flange, the upper flange as an L-flange, which is to be directed into the interior of the tower. The plate 16 and the flanges 18,19 are composed, for example, of steel or a composite material.

At their lower ends 12,14, the wall elements 3,4 are fastened to the foundation 22, via the flanges 18,20 (cf. FIG. 2), by connection means not shown here, e.g. screws and nuts, and at their upper ends 13,15 are connected to an adapter element 25 shown in FIG. 5. The adapter element 25 has a flange 28 that matches the flanges 19,21, such that the wall elements 3,4 can be rigidly connected to the adapter element 25 by means of screws and nuts 29. The adapter element 25 forms a connection member to further tower segments 23, and is connected to further tower segments 23, likewise by means of screws and nuts 32, via a flange 30 of the adapter element 25 and via a matching flange 31 of the further tower segment 23. The adapter element 25 forms a transition between this circular shape and the hexagonal shape of the tower segment 2 shown in FIG. 6b. FIG. 6c shows the lower ends 12,14, with the flanges 18, 20 provided thereon.

Trapezoid limbs of the plates 16 of the wall elements 3,4, which form vertical edges 10,11 of the wall elements 3,4, are arranged at such a distance from one another in the tower segment 2 that they do not touch over their entire length.

A rigid connection of the wall elements 3,4,5,6,7,8 to one another is therefore effected only via the respective flanges 18,19,20 and the foundation 22, and the adapter element 25.

Figure 3:
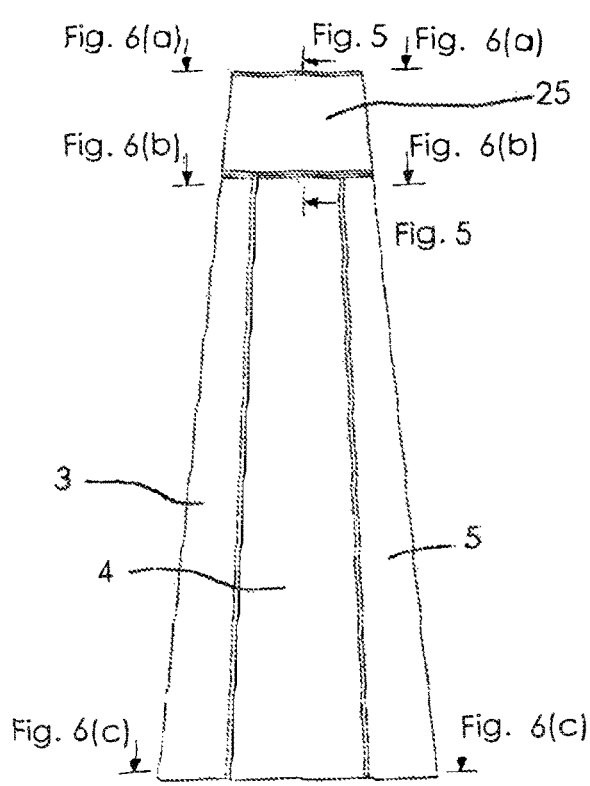

FIG. 6 shows various horizontal sections through the tower 1, the section planes of which are shown in FIG. 3. As shown by FIG. 6a, the adapter element 25 has, at its upper end, at which it is provided with the flange 31, a circular shape that exactly matches the circular cross-sectional shape of the tower segments 23.

In order to seal the tower segment 2 outwardly against environmental influences, a sealing material 27, e.g. a sealing rubber, may be arranged between the vertical edges 10,11, as represented in FIG. 7.

Reference is now made to FIGS. 8 to 11, where parts that are the same or act in the same way are denoted by the same reference number as in FIGS. 1 to 6, and a letter is in each case appended to the respective reference number.

The exemplary embodiment according to FIG. 8 shows that, for the purpose of mechanically reinforcing them, wall elements 3a,4a,5a,6a,7a,8a may be provided with stiffening ribs 27, e.g. on their sides that face toward the interior of the tower.

Figure 9:
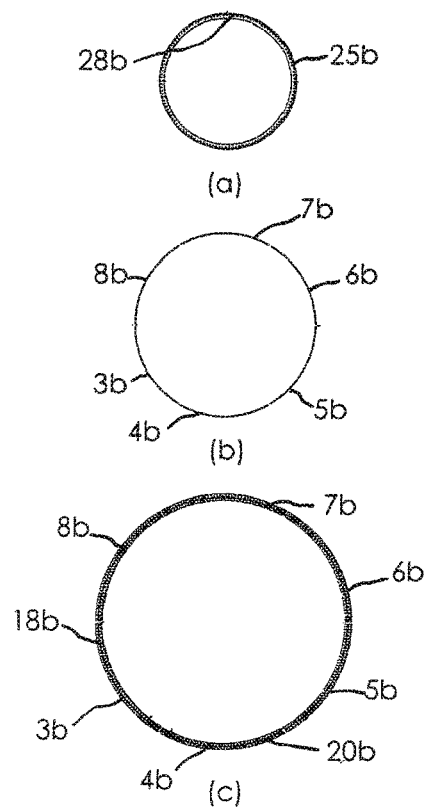

Further, as shown by FIG. 9, wall elements 3b,4b,5b,6b, 7b,8b could be curved about their longitudinal axis in order to impart a round shape to a tower segment.

It is understood that the curvatures of the wall elements 3b,4b,5b,6b,7b,8b need not necessarily be curved in such a manner that, as represented here, a circular-shaped cross section is obtained. The curved wall elements 3b,4b,5b,6b, 7b,8b may also be provided with a stiffening rib whose shape matches the curvature.

In the present exemplary embodiments, the lower flanges 18 of the wall elements are shown as T-flanges. They could also be formed, however, as L-flanges directed toward the interior of the tower or toward the exterior of the tower. The upper flanges 19 could also be formed as a T-flange or L-flanges directed toward the exterior of the tower.

Further, the plates 16, could be of other appropriate shapes, different from the trapezoid shape shown. For example, they could be rectangular.

Figure 10:
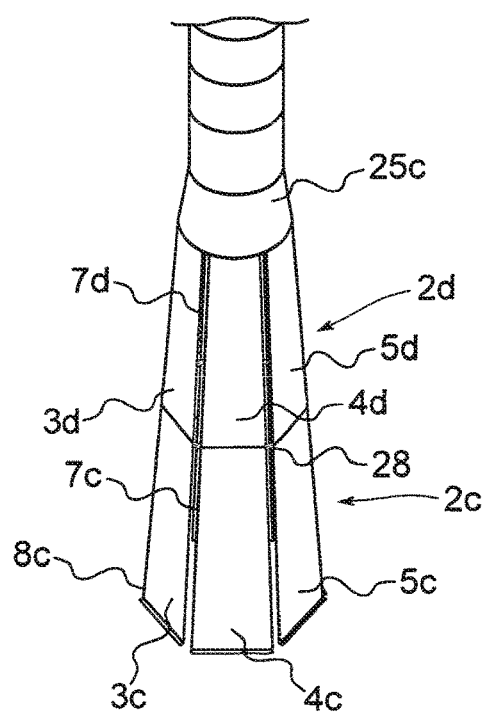

Represented in FIG. 10 is a lower portion of a further tower according to the invention, having a lower tower segment 2c that is fastened to a foundation and has wall elements 3c,4c,5c,6c,7c,8c, and having a further tower segment 2d that is arranged over the tower segment 2c and has further wall elements 3d,4d,5d,6d,7d,8d. The wall elements 3c,4c,5c,6c,7c,8c,3d,4d,5d,6d,7d,8d are connected to one another via a connection frame 28, fastened to which there are L-flanges, not shown here, directed toward the interior of the tower. Owing to the superimposed arrangement, greater heights can be achieved in the design of the tower according to the invention. If appropriate, an entire tower can be constructed by means of the wall elements according to the invention.

Figure 11:
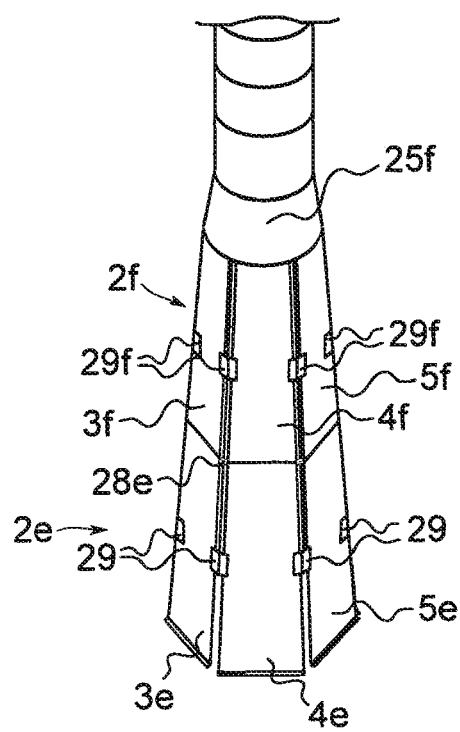

In the case of the lower portion of a further tower according to the invention, shown in FIG. 11, wall elements 3e,4e,5e and 3f,4f,5f are connected to one another, at their vertical edges, by means of lugs 29 and 29f, respectively. The lugs 29, 29f are fastened to the wall elements 3e,4e,5e, 3f,4f,5f. They serve to increase the robustness of the respective tower segments 2e,2f that are formed by the wall elements 3e,4e,5e,3f,4f,5f. Unlike the exemplary embodiment according to FIG. 11, in which the wall elements 3e,4e,5e,3f,4f,5f, as explained above with reference to FIG. 10, are connected to one another by a connection frame 28e, the lugs 29,29f may also be used to connect the wall elements 3,4,5,6,7,8 (as explained above with reference to FIGS. 1 to 9). In particular, the connection may also be provided if the sealing material 27 (cf. FIG. 7 and the explanations relating thereto) is arranged between the vertical edges 10,11. It is understood that a plurality of the lugs 29,29f could also be provided for connecting the respectively adjacent wall elements 3,4,5,6,7,8,3e,4e,5e,3f,4,5f via the vertical edges.

Insofar as there is no sealing material 27 provided between the vertical edges of the wall elements 3,4,5,6,7,8, 3e,4e,5e,3f,4,5f, the lugs 29,29f and their respective connections to the wall elements 3,4,5,6,7,8,3e,4e,5e,3f,4,5f may be produced, checked and/or serviced from one side of the tower, in particular from the exterior, in which case for this purpose it is possible to reach through the gap between the wall elements 3,4,5,6,7,8,3e,4e,5e,3f,4,5f. If the sealing material 27 is provided, a preferably closable opening, through which it is possible to reach, may be provided in the sealing material 27, besides the lugs 29,29f.

The invention claimed is:

1. A tower of a wind power plant, comprising at least one tower segment that has a plurality of load-bearing wall elements arranged horizontally next to one another to form an outer wall of the tower, wherein a rigid connection is formed, between the wall elements that are arranged directly next to one another, by horizontal end portions of the wall elements, and is not effected, or is effected only in certain segments, by vertical edges of the wall elements, wherein the vertical edges of the wall elements, which are in each case arranged directly adjacent to one another, are arranged entirely spaced from one another in a horizontal direction, further comprising means arranged between the wall elements for sealing the tower outwardly.

2. The tower according to claim 1, wherein the vertical edges of a least individual wall elements of directly adjacent wall elements are connected to one another in certain segments by at least one connection element.

3. The tower according to claim 2, wherein the connection element is a projection extending from the wall element or a lug.

4. The tower according to claim 1, wherein the rigid connection is formed by at least one segment of the vertical edges that is of a length of not more than 10% of a total length of the vertical edges respectively connected to one another.

5. The tower according to claim 4, wherein, the length of the segment is not more than 5% of a total length of the vertical edges.

6. The tower according to claim 1, comprising a connection element formed on each of the respective horizontal end portions by which the wall elements are connectable to at least one of the group consisting of a footing, further wall elements of another tower segment, a tower head carrying a wind turbine, and an adapter element by which the wall elements are connectable to at least one of the group consisting of the footing, the further wall elements and the tower head.

7. The tower according to claim 6, wherein the connection element is a flange.

8. The tower according to claim 6, wherein each of the wall elements is a prefabricated structural unit having a plate and the connection element.

9. The tower according to claim 8, wherein the plate is composed of steel or a composite material.

10. The tower according to claim 9, wherein the plate is composed of reinforced concrete or fiber composite material.

11. The tower according to claim 9, wherein the plate is formed as a single piece.

12. The tower according to claim 8, wherein the plate is flat or curved.

13. A method for producing a tower of a wind power plant, comprising the steps of: arranging a plurality of load-bearing wall elements horizontally next to one another to form a tower segment and an outer wall of the tower; forming a rigid connection between the wall elements that are arranged directly next to one another by horizontal end portions of the wall elements, wherein the rigid connection is not effected, or is effected only in certain segments, by vertical edges of the wall elements; arranging the vertical edges of the wall elements, which are is each case arranged directly adjacent to one another entirely spaced from one another in a horizontal direction; and arranging means between the wall elements for sealing the tower outwardly.

14. The method according to claim 13, including connecting the vertical edges of at least individual wall elements of directly adjacent wall elements to one another in certain segments by at least one connection element.

15. The method according to claim 14, wherein the connection element is a projection extending from the wall element or a lug.

16. The method according to claim 13, including arranging the wall elements on only a single foundation.

* * * * *